R. B. PRINDLE.
Thill-Coupling.
No 22,672.  Patented Jan. 18, 1859.
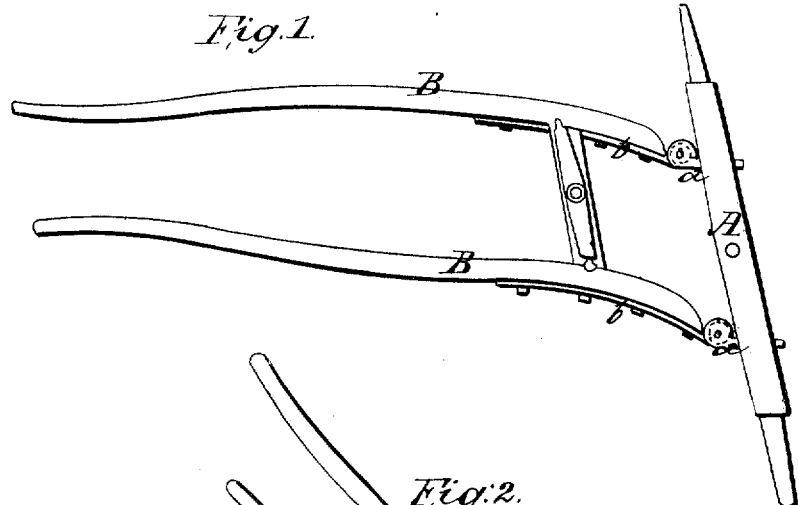
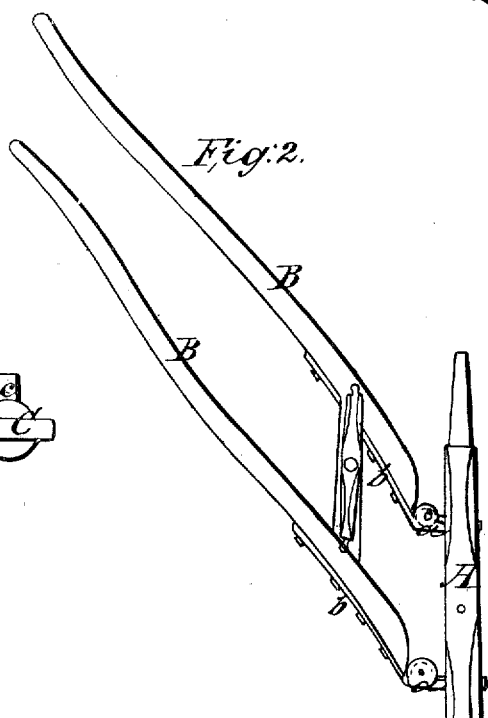
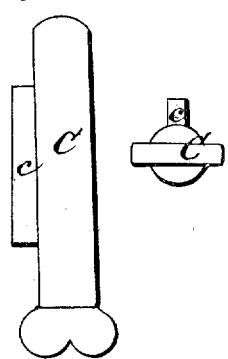
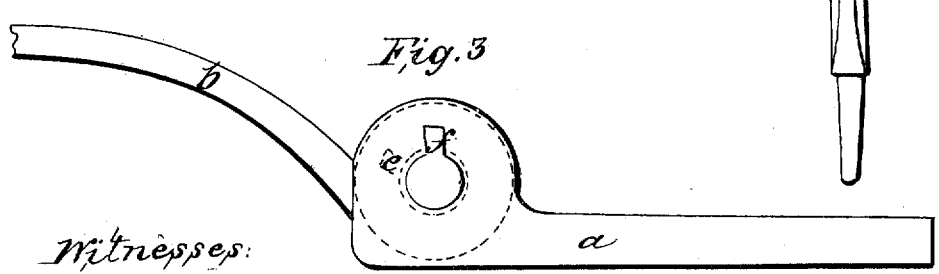
Witnesses:
Edwd. S. Brown
J. B. Woodruff
Inventor:
R. B. Prindle

UNITED STATES PATENT OFFICE.

R. B. PRINDLE, OF COVENTRY, NEW YORK.

MODE OF ATTACHING THILLS TO VEHICLES.

Specification of Letters Patent No. 22,672, dated January 18, 1859.

*To all whom it may concern:*

Be it known that I, R. B. PRINDLE, of the town of Coventry, Chenango county, State of New York, have invented new and useful Improvements in the Mode of Connecting Thills or Shafts to Vehicles; and the following is a clear and exact description of the same, reference being had to the accompanying drawings, which make a part of this specification.

Like letters refer to like parts in the different figures.

The nature of my invention consists in the mode of making the bolt or pin, and the manner of inserting it, for the purpose of attaching thills or shafts to vehicles, or for other purposes which may require a part to be removed and replaced with facility and a certainty of retaining its position.

In order to enable others skilled in the arts to make and use my invention I will proceed to describe it more in detail.

(Figure 1) represents the shafts attached to the axle in a position for draft, in which the bolt or pin is perfectly secure from coming or being taken out. (Fig. 2) represents the shafts raised up in a position so that the bolt or pin is free to take out and replace by the thumb and finger. (Fig. 3) is an enlarged view of the hinge, or what is technically termed a cockeye, showing the hole for the flange bolt. (Fig. 4) shows the flange bolt or pin.

(A) is the axle to which a part of the hinge or cockeye (*a*) is secured in any of the usual modes.

(B, B,) are the shafts with the other portion of the hinges (*b, b,*) attached.

In Fig. 4 (C,) is the bolt or pin to hold the thills or shafts in their places, and is made round with a flange (*e*) projecting on one side, and is fitted into the slot (*e*) in the portion of the hinge that is made fast to the shaft, and turns with it. In one side of the cockeye (*a*) (as seen in Fig. 3,) there is a corresponding slot (*f*) to admit the flange bolt or pin being easily inserted.

Having thus fully described my improved method of attaching shafts to vehicles, etc., what I claim as new and, desire to secure by Letters Patent, is—

The flange on the bolt or pin is so made and inserted that it cannot be removed when the joint is varied from the position in which the bolt is introduced.

R. B. PRINDLE.

Witnesses:
   EDM. F. BROWN,
   J. B. WOODRUFF.